United States Patent [19]

Spitz

[11] Patent Number: 5,729,001
[45] Date of Patent: Mar. 17, 1998

[54] METHOD FOR EVALUATING A SUCCESSION OF BAR CODE SYMBOLS

[75] Inventor: Glenn Steven Spitz, Northport, N.Y.

[73] Assignee: Webscan, Inc., Brentwood, N.Y.

[21] Appl. No.: 584,242

[22] Filed: Jan. 11, 1996

[51] Int. Cl.$^6$ ..................................................... G06K 7/10
[52] U.S. Cl. ............................................. 235/462; 235/456
[58] Field of Search .................................. 235/462, 472, 235/436, 437, 454, 456

[56] References Cited

U.S. PATENT DOCUMENTS

| | | | |
|---|---|---|---|
| 4,251,798 | 2/1981 | Swartz et al. | 235/462 |
| 4,699,531 | 10/1987 | Ulinski, Sr. et al. | 400/74 |
| 5,051,567 | 9/1991 | Tedesco | 235/462 |
| 5,080,456 | 1/1992 | Katz et al. | 359/214 |
| 5,194,720 | 3/1993 | Reinnagel et al. | 235/437 |
| 5,231,293 | 7/1993 | Longacre, Jr. | 250/568 |
| 5,260,553 | 11/1993 | Rockstein et al. | 235/472 |
| 5,272,322 | 12/1993 | Nishida et al. | 235/462 |
| 5,285,056 | 2/1994 | Tedesco et al. | 235/472 |
| 5,317,166 | 5/1994 | Tafoya | 250/568 |
| 5,340,973 | 8/1994 | Knowles et al. | 235/472 |

OTHER PUBLICATIONS

American National Standards Institute (ANSI), "Bar Code Print Quality Guideline", ANSI X3.182–1990 (Excluding the Annex Sections), Mar. 1990.
Uniform Code Council, "Quality Specification for the UPC Printed Symbol" [Not Submitted—Multiplicity of Above Item AO.], Sep. 1994.

*Primary Examiner*—Donald T. Hajec
*Assistant Examiner*—Thien Minh Le
*Attorney, Agent, or Firm*—FST Patent Associates

[57] ABSTRACT

A method to detect, process, and evaluate the quality of a succession of spaced bar code symbols. The symbols are disposed on a continuous substrate, moving past a scanner unit arranged to scan each symbol of the succession, one after the other. The method of the invention continuously scans the substrate to detect the entry of a bar code symbol into the field of view of the scanner unit. The presence of the bar code symbol in the scanner's field of view being established by a first valid decode of the symbol. Next, the first decoded scan and a plurality of subsequent decodable and non-decodable scans of the bar code symbol are processed to determine and store at least one evaluation attribute. The scanning and processing of the bar code continues until a predetermined number of consecutive non-decodable scans are processed, thereby indicating the absence of the bar code symbol from the field of view of the scanner and that the symbol has moved past the scanner. A number of the scans processed and the evaluation attributes determined for each scan, may then be employed to determine a measure of quality indicative of overall quality of the bar code symbol. The process may then be repeated for each bar code in the succession of bar code symbols. Additional steps may be included with the present methods to count regions on the moving substrate wherein bar code symbols are known to be disposed.

28 Claims, 3 Drawing Sheets

METHOD FOR EVALUATING A SUCCESSION OF BAR CODE SYMBOLS

CROSS REFERENCE TO RELATED APPLICATION

The subject matter disclosed herein is related to that of U.S. patent application Ser. No. 08/575,097 filed on Dec. 19, 1995, which now U.S. Ser. No. 633,488.

BACKGROUND OF THE INVENTION

1. Field of the Invention

The present invention relates to methods that are useful in evaluating and verifying a continuos succession of bar code symbols. More particularly, the invention provides methods to count, process, and quantitatively evaluate a succession of bar code symbols while maintaining statistics related to the number of symbols processed, along with the associated quality of the evaluated bar code symbols.

2. Description of the Prior Art

The desire and need to verify bar code symbols is well known in the art. With the ubiquitous bar code symbol now used by virtually all inventory intensive establishments, such as warehouses and retail stores, methods to support evaluation and verification of bar code symbols, especially a succession of bar code symbols disposed on a continuous and moving substrate, are needed.

There are many hand held and fixed position bar code verifiers known in the art. Hand held systems enable a user to manually position a scanner unit to scan different portions of the symbol being verified. An analysis may then be conducted by the verifier to determine various evaluation parameters. These devices, and their methods of operation, are generally capable of evaluating and verifying individual bar code symbols in a manual manner. Hand held verifiers may be categorized into two fundamental groups of scanning verifies: contact verifiers and non-contact verifiers. Contact verifiers are physically placed in contact with the substrate on which the symbol is printed. Non-contact verifiers are generally scanner unit based apparatus, wherein the scanner is positioned at a fixed distance from the bar code symbol being evaluated. Many of these systems are manually operated to scan selected portions of a single symbol being evaluated.

Some non-contact verifying systems known in the art are configured to be mounted on bar code printers. These systems evaluate the quality of a bar code symbol as it is printed in an on-demand or synchronous manner. If the quality of the just printed symbols is determined to be below a preselected level, the printer can be stopped. In these systems, a significant amount of communication and connection is provided between the printing mechanism and the verifier. The fact that the paper advance means and the print head of the printing mechanism are under control of a computer means, which controls both the printing mechanism and the verifier, greatly simplifies the starting and stopping of the scanning and verifying of each newly printed symbol. Accordingly, the communication and connection between the printer and the verifier determines when the evaluation is to start. Thus, the location of the symbol is well established with this method of verification. However, on high speed flexographic printing presses and the like, which are generally mechanical rather than electronic in nature, the exact location of the bar code symbols to be evaluated is not readily known. In addition, often the bar code symbol to be evaluated and verified is disposed around other printed information, possibly making evaluation somewhat more difficult.

There is currently a need to have high speed verifier arrangements (with associated methods of operation) for use in demanding applications wherein a succession of bar code symbols must be evaluated in an automated fashion. For example, a skilled person can appreciate the considerable difficulty of evaluating bar code symbols being rapidly printed on a printing press. Especially where the apparatus does not advance the paper substrate in sync with the verifier activities, and the evaluation must determine a count of the number of symbols printed, verify decodability, and a variety of well known evaluation attributes for each symbol (by processing a group of scans taken of the symbol), and present the evaluation information to an operator or monitoring system. It should be understood that the terms "processing" and "process", when referring to bar code symbols, is defined as determining if the bar code symbol is decodable and further determining one or more evaluation attributes.

There is a current need to evaluate in an automated fashion a succession of bar code symbols disposed on a moving substrate in repeating regions, or in repeating images. A particular need would be satisfied by an apparatus that could evaluate a succession bar code symbols in real-time and provide an immediate indication of the quality of each symbol. Such evaluation allows for the immediate response should a problem be detected in the quality of the symbols being applied to a substrate (e.g. being printed). At a point in time were the symbols being applied are found to be of low quality, the printing press can be stopped and the cause of the problem corrected. The press may then be restarted with little loss of material and the virtual elimination of the need to reprint and replace poorly printed bar code symbols.

At present, there are a variety of well known guidelines and standards used to quantitatively evaluate the quality of bar code symbols. A recent quality evaluation guideline published in September 1994 by the Uniform Code Council (UCC), is titled "Quality Specification for the UPC Printed Symbol". This document, which is hereby incorporated by reference, presents an overall methodology for printing and verifying the common Universal Product Code, UPC, symbol. In particular, parts 2 and 3 of the UCC document provide definitions and related subject matter for a number of evaluation attributes. The evaluation attributes, which are also known as SRP parameters, and very generally as figures of merit, may be determined and combined to indicate the relative quality of the evaluated symbol. The term "relative quality" can be assumed to be the quality of a bar code symbol with respect the level of quality established by well known standards and guidelines known to skilled persons.

With the advent of rigorous and well defined quantitative measures to evaluate bar code symbols, there is a need for improved methods to support high speed automated evaluation and verification, particularly where real-time evaluation is desired. Current standard evaluation guidelines, such as the UCC quality specification, call for a plurality of scans spaced along the height of the symbol to be evaluated. The results of the processing of the individual scans must then be combined to determine a measure of quality indicative of the overall quality of the symbol. Whereas, this requirement can be manually satisfied with hand-held verifiers as discussed above, and with on-demand printers which control and coordinate the printing, scanning and processing of symbols to be evaluated, there is a need for methods to group scans (and the associated scan reflectance profiles) that correspond to each individual bar code symbol in a succession of spaced bar code symbols.

Objects of the present invention are, therefore, to provide new and improved methods to enable the evaluation and verification of a succession of bar code symbols having one or more of the following capabilities, features, and/or characteristics:

enable automated high speed counting, decoding and evaluating of bar code symbols;

asynchronous delimitation between individual bar code symbols when evaluating a succession of bar code symbols disposed on a continuous and moving substrate;

rapid determination of the quality of each symbol in a succession of bar code symbols;

indicate trends of increasing or decreasing quality of bar code symbols;

SUMMARY OF THE INVENTION

In accordance with the invention, a method is disclosed to detect, process, and group a plurality of scans associated with each bar code symbol in a succession of spaced bar code symbols. The symbols are disposed on a substrate moving past a scanner unit that is arranged to scan each symbol, one after the other. The detection and processing of the scans associated with each symbol is desired to monitor the quality of the bar code symbols disposed on the substrate.

The method of the invention commences with the continuous scanning of the moving substrate to detect the presence of a bar code symbol in the field of view of the scanner unit. The presence of the bar code symbol in the scanner unit's field of view is determined by a first valid decode of the symbol. Next, the first decoded scan and a plurality of subsequent decodable and non-decodable scans associated with the bar code symbol are processed to determine and store at least one evaluation attribute for each scan processed. The scanning and processing of the bar code symbol continues until a predetermined number of consecutive non-decodable scans are processed thereby indicating the absence of the bar code symbol from the field of view of the scanner unit and that the symbol has moved past the scanner unit. A number of the scans processed may then be employed to determine a measure of quality indicative of overall quality of the bar code symbol. The above steps would then be repeated for each bar code symbol in the succession of bar code symbols. Additional steps may be included to detect regions of the moving substrate wherein bar code symbols is known to be disposed and maintaining counts of both the number of regions detected and the number of bar code symbols scanned.

BRIEF DESCRIPTION OF THE DRAWINGS

In the drawings, like elements are assigned like reference numerals. The drawings are briefly described as follows.

DETAILED DESCRIPTION OF THE INVENTION

Bar code verification systems of the type for which the method of the present invention apply scan a bar code symbol and produce an analog signal known as a scan reflectance profile signal, or simply an SRP signal. The SRP signal, which is representative of the elements comprising the bar code symbol, may be processed to decode and generally evaluate and verify the quality of the scanned bar code symbol.

Figure 1:
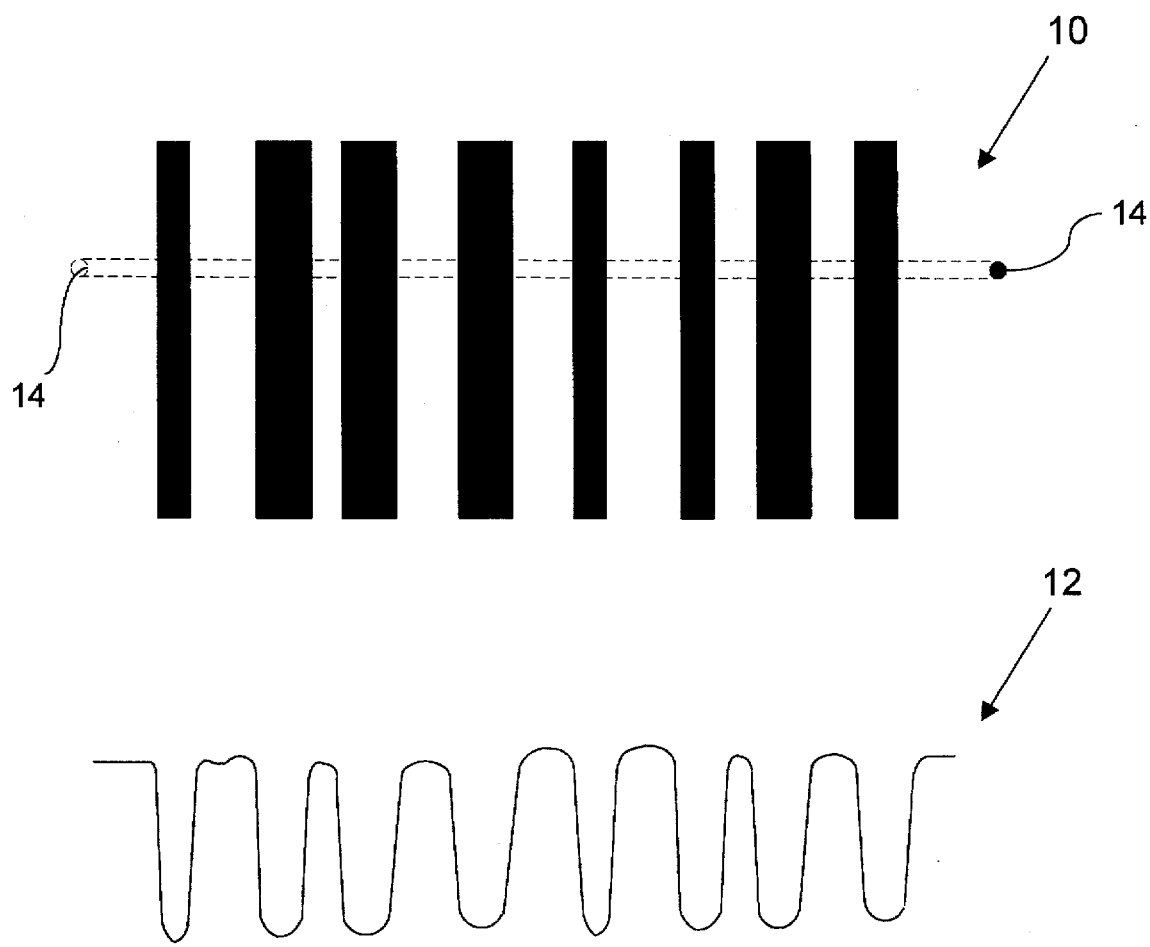
FIG. 1 illustrates an enlarged view of a bar code symbol and a corresponding scan reflectance profile (SRP) signal generated by scanning the bar code symbol with a scanner unit.

Referring to FIG. 1, there is illustrated an enlarged view of a portion of a bar code symbol 10, along with a corresponding scan reflectance profile (SRP) signal 12. The SRP is generated by a suitable scanner unit sweeping a laser beam spot 14 at nearly constant velocity across the bar code symbol 10 (from left to right as shown). As the laser spot 14 is swept, the scanner unit senses the amount of reflected light transmitted back from the elements of the symbol 10 to generate the SRP signal 12. The SRP signal 12 may then be processed, using either digital or analog techniques, to evaluate the quality of the associated bar code symbol 10. The generation and processing of scan reflectance profile signals is well known in the art with many suitable apparatus and methods available. For example, an SRP may be sampled, by a device such as an analog-to-digital converter, to produce a collection of sample values representative of the bar code symbol scanned. The entire collection of sample values (or a subset of filtered sample values required to evaluate the bar code) may then be utilized to determine various evaluation attributes indicative of the quality of the scanned bar code symbol.

In order to provide for the "overall" evaluation of a bar code symbol, a succession of scans are made at somewhat equally spaced locations within an "inspection band" along the height of the elements composing the bar code symbol. Often, each scan of the symbol is processed to assign a measure of quality to one or more of the evaluation attributes determined (by processing the scan). The measures of quality for each attribute determined for a scan may then be combined to determine a single measure of quality for that scan. Then, the measures of quality for each scan are usually combined to determine an overall measure of quality for symbol. The overall measure of quality of the symbol being indicative of the overall relative quality of the evaluated symbol. For example, the UCC quality specification defines a number of evaluation attributes (SRP parameters) that may be employed to quantitatively score each processed SRP of a scanned bar code. The evaluation attributes include symbol contrast (SC) and edge contrast (EC), just to name a few. Each attribute may be determined by a proper analysis of the scan reflectance profile and assigned a measure of quality. The UCC specification then calls for the assigning of a measure of quality of that scan that is equal to the lowest measure of quality determined for the evaluation attributes considered (for that scan). When a number of scans have been processed and assigned measures of quality, an overall measure of quality for the entire bar code symbol may be determined by combining (averaged in the case of the UCC approach) the measures of quality assigned to each individual scan of the symbol. The overall measure of quality for the entire bar code symbol is therefore a function of a number of scans taken over some portion of the height of the symbol and indicative of the relative quality of the scanned symbol.

In addition to defining the above listed evaluation attributes, the UCC quality specification, as well as other known standards, provide for the assigning of weighted values to facilitate the communication of the level of quality determined. For example, the UCC specification uses a predetermined plurality of weighted values equivalent to an academic grading system. The UCC plurality of weighted values are A, B, C, D, and F; wherein 'A' is the highest quality possible and 'F' is an unacceptable quality level. This approach and others known to skilled persons enables an unskilled operator to quickly identify the quality of one or more bar code symbols.

Figure 2:
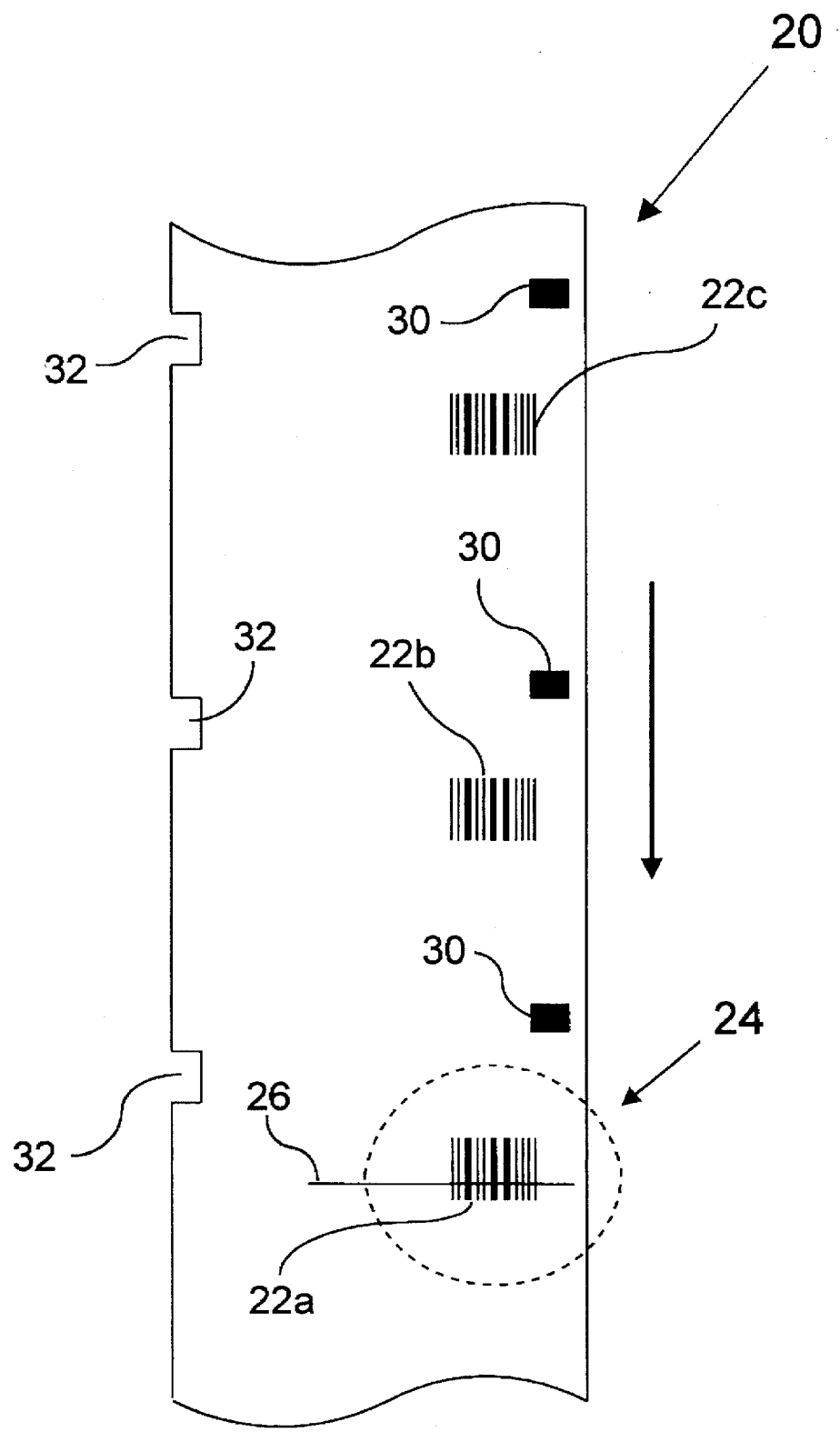
FIG. 2 depicts a moving substrate with a succession of bar code symbols disposed thereon.

Referring now to FIG. 2, there is depicted a moving and continuous substrate 20 with a succession of bar code symbols 22a, 22b and 22c, disposed thereon. As shown, the motion of the substrate 20 is down towards the bottom of FIG. 2. It should be noted that other printed images may also be disposed on the substrate (and in a field of view of a scanner unit). As the substrate moves along a predetermined path, the symbols disposed thereon are moved past a scanner unit arranged to scan each symbol of the succession of symbols, one after the other. Typically, the scanner unit will scan each symbol many times, therefore, providing a plurality of scans taken over the height of the symbol. The point or location where the scanning occurs will be defined as a scan line location having a corresponding scan line, such as scan line 26, as shown in FIG. 2. A skilled person can appreciate the considerable difficulty posed by the fact that a scanner unit "sees" a narrow one-dimensional slice of substrate 20 on each scan. Moreover, as the substrate 20 is moving in an asynchronous manner with respect to the scans made by the scanner unit, some scans will be on a bar code symbol, while others will occur partially on, or between bar code symbols. It is an object of the present invention to detect the bar code symbols moving on the substrate, process a number of scans (via the SRP signals generated by a plurality of scans) and evaluate the relative quality of the symbol scanned, as well as a plurality of subsequent symbols in the succession of symbols.

Figure 3:
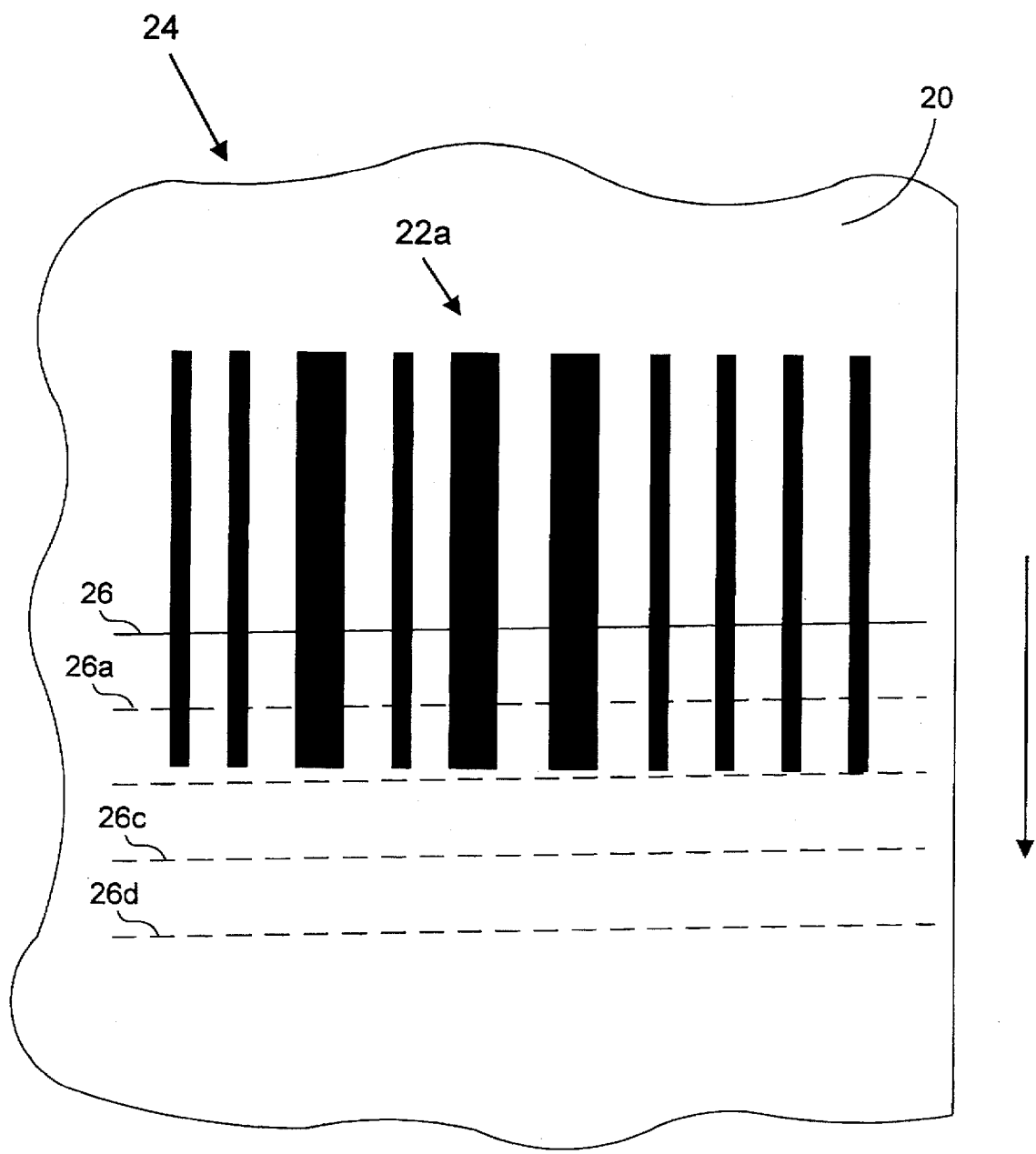
FIG. 3 is an enlarged view of a portion 24 of the substrate shown in FIG. 2 with a bar code symbol disposed therein.

Referring to FIG. 3, there is shown an enlarged portion 24 of the substrate 20 of FIG. 2. FIG. 3 will be helpful to clearly define several embodiments of the method of the present invention. As the substrate 20 moves a bar code symbol 22a will be scanned. The first scan line 26d is taken before the symbol 22a enters the field of view of a scanner unit. The scan reflectance profile (SRP) for scan line 26d would be processed and found to be non-decodable. If not decodable, an assumption is made that a bar code symbol was not scanned. The next scan line 26c represents a possible location on the moving substrate 20 of the next scan line. Again, the associated SRP would be processed and found to be non-decodable. Eventually, a scan is made at scan location 26a, the SRP signal is processed, and a valid decode is determined. The method has thereby determined the presence of the bar code symbol 22a in the field of view of the scanner unit using the scan location (on the substrate 20) corresponding to scan line 26a. As a function of the rate at which the substrate moves, typically expressed in feet/minute, and the rate at which scans are made, many scans of the actual bar code symbol may be taken and processed. As shown in FIG. 3 the current position of the scan line is scan 26. For a bar code symbol having at least a fair measure of quality, one skilled in the art would recognize that there is a good likelihood that scan line 26 and several other subsequent scan lines (not shown) would produce valid decodes.

Scanning of the bar code symbol 22a of FIG. 3 would continue thereby providing a series of SRP signals along the height of the bar code symbol 22a. The SRP signals may then be evaluated to begin to determine the overall measure of quality of the bar code symbol 22a currently being scanned. At some point in time the symbol 22a leaves the field of view of the scanner unit. And a subsequent group of scans processed would be found to be non-decodable. When a predetermined number of consecutive non-decodable scans have been processed, the method of the invention assumes the end of the bar code symbol being scanned has been reached. That is, with the occurrence of a preselected number of consecutive non-decodable scans, say 5 for example, the region of the substrate 20 with the bar code symbol 22a disposed therein has moved past the scanner unit. The process would then repeat by processing the SRP signals of subsequent scans until the presence of the next bar code symbol (in the succession of bar code symbols) is detected in the field of view of the scanner unit by a determining a valid decode. The next bar code would then be scanned and evaluated.

It should be noted that the distance between the spaced bar code symbols 22a, 22b and 22c, as shown in FIG. 2, is illustrative only. The distance between actual bar codes may be greater than or less than that illustrated. A limiting consideration for the minimal distance supported by the method of the invention is the distance required to determine the predetermined number of consecutive non-decodable scans before the next bar code symbols enters the field of view of the scanner unit. It should also be understand that the symbols being evaluated need not be positioned in a linear manner as shown in FIG. 2, but may be located anywhere on the moving substrate that is within the field of view of the scanner unit.

A person skilled in the art will recognize a limitation of the above disclosed method. The limitation is related to bar code symbols of such poor quality that a valid decode does not result, even if a number of scans are made of the symbol while in the field of view of a scanner unit. In this instance, the bar code symbol will not only be "missed", it will omitted from the results determined for the succession of bar code symbols being evaluated. It should be noted that often verifying apparatus, including those that utilize the method of the present invention, are employed to determine when the quality of bar code symbols being printed have dropped to a minimal level of quality. Usually, when this occurs the symbols being printed are still decodable. In addition, an advanced and aggressive decode algorithm may be employed to partially process each scan taken to determine if the symbol is within the field of view of the scanner unit. The approach of using aggressive decode algorithms is discussed in section 3.5.5 of the UCC quality specification. If this approach is utilized, each scan would be evaluated for a valid decode twice—once to determine if the symbol is still in the field of view of the scanner and a second using a generic or standardized decode algorithm. An alternate solution to this limitation will now be presented.

Referring again to FIG. 2 there is illustrated several means which may be employed to detect a region of substrate 20 wherein a bar code symbol or symbols are known to be disposed. Eye mark 30 is a type of delimitation means known in the art for indicating delimitations between repeating regions, or repeating images, when disposing (e.g. printing) information on a moving substrate. The eye mark, which is essentially a small area of low reflectivity, is detected by a properly arranged eye mark sensor. The detection of an eye mark is therefore useful to establish a delimitation of regions wherein a bar code symbol is disposed. The previously disclosed method would then be employed to "find" and evaluate the actual bar code symbol within the delimited region. However, now if a bar code will not decode properly, it will not be "missed". If no valid decodes are detected between eye marks, the bar code symbol may be assigned a measure of quality indicative of a poor level of quality. For example, if using the UCC quality specification, a bar code symbol which is not decodable is assigned a measure of quality equal to zero (0) and further assigned a weighted value of 'F'.

Turning again to FIG. 2 there is illustrated an alternate means which may be employed to detect a region of substrate 20 wherein a bar code symbol is known to be disposed. Indexing notch 32 may be positioned, in the same manner as an eye mark 30, to delimit repeating regions of a moving substrate. The indexing notch 32 would be sensed by a suitable mechanical or optical means to determine the start of a region having one or more bar code symbols disposed therein.

For each of the previous methods discussed to delimit a region of the substrate, a mark or index must be placed at the location of the delimitation. For a given application this may be impractical or impossible. An alternate method that may be employed to delimit successive regions of a substrate moving though an apparatus such a printing press incorporates the use of proximity switches, or the like, to count the rotation of gear teeth on an impression roller. Thus, a count is maintained and checked to determine when the value of the count reaches some predefined value indicative of the start (and/or end) of a region or image. There are several advantages of this approach. First no marks or indexes need to be physically placed on the moving substrate. Second, the monitoring of the gear teeth count value may be refined to actually indicate a specific portion of the delimited region wherein the bar code symbol is known to be located. One skilled in the art will appreciate the number of variations that may be utilized by monitoring the gear teeth count value, and the like. Consider one simple example of the use of counting gear teeth. Assume it is known that a bar code symbol has a printed height equivalent to the rotation of 10 gear teeth and the start of a new image (i.e. one full revolution of the impression cylinder) occurs at some known count interval. Therefore, the scanning of a region is started by the determination of a particular count value (or modulus of a count value) and a "search" begins to determine a valid decode. Once a valid decode is determined, the next series of scans that occur within, say the next 8 increments of the gear teeth count (from the count of the initial symbol detection), may be assumed to be scans which occur on the bar code symbol. A number of variations using known means to count gear teeth of printing press cylinders are known in the art and contemplated as being within the scope of the present invention.

If the method of the invention includes additional steps to maintain a count of the number of bar code symbols scanned, and possibly the number of regions scanned, a variety of numerical statistics may be determined and used to inform an operator of the level of quality of bar code symbols being disposed on a continuous and moving substrate. One skilled in the art will appreciate the types of numerical statistics, and the like, which may be determined from data such as the number of symbols assigned to each of a plurality of measures of quality (or the corresponding weighted values), when considered with the number of symbols and regions scanned.

Several examples of numerical statistics will be briefly discussed. As each bar code is detected and evaluated, a count of the total number of bar codes, and possibly delimited regions, may be maintained. In addition, counts of the number of bar codes assigned a specific measure of quality or weighted value may be maintained. Therefore, if the count of the total number of symbols detected is divided into the count of the number of bar code symbols having a particular weighted value, a percentage of symbols assigned to that weighted value may be determined. Similarly, if the count of the total number of symbols detected is divided into the counts of the number of bar codes assigned to each weighted value of the plurality of weighted values, one can determine a plurality of percentages, each percentage determined indicating the percentage of symbols assigned to each weighted value with respect to the total number of symbols detected and processed. If a means is provided to count the total number of regions (or delimitations between bar codes) then the above percentages may also (or alternately) be determined based on the total number of regions detected, and not on the total number of symbols scanned. It should be understood that the percentages determined may be compared to predefined maximum percentages. If a percentage is determined and found to exceed a predefined maximum percentage, an alarm means or beacon may be activated.

The analysis of the data collected as discussed above, may be further grouped into predefined intervals. The use of intervals may be helpful to determine trends in the level of relative quality of bar code symbols, and indicate to an operator when a problem is developing. In particular, the use of time intervals and quantity intervals may be employed to clearly indicate if the relative quality of printed bar code symbols being printed is increasing or decreasing. For example, assume the weighted values of A, B, and C are used to evaluate bar code symbols, and are determined for a first time interval equal to the last minute and a second time interval equal to the last 5 minutes. Further, assume the evaluation results for a group of recently printed bar code symbols are summarized as follows: First interval, A=4, B=5 and C=8; Second interval, A=50, B=25, C=10. It would be obvious to an operator that a problem is developing with the quality of the symbols printed based on a comparison of the two intervals. Similarly, intervals may be defined as comprising a "rolling window" of the last, say, 100 symbols printed. This rolling window (of the last 100) symbols may be compared to a rolling window of, say, the last 10 printed symbols to determine a trend in the quality of the symbols being printed.

One skilled in the art of numerical statistics and numerical analysis will appreciate the variety numerical information that may be produced by utilizing counts such as the number of bar code symbols and regions scanned, and the number of bar codes assigned particular measures of quality or particular weighted values. It should, therefore, be noted that the above examples are meant of be illustrative only.

While there have been described the currently preferred embodiments of the present invention, those skilled in the art will recognize that other and further modifications may be made without departing from the invention and it is intended to claim all modifications and variations as fall within the scope of the invention and the appended claims.

What is claimed is:

1. A method to detect, process, and group a plurality of scans associated with a succession of spaced bar code symbols, the symbols disposed on a substrate moving past a scanner unit arranged to scan each respective symbol, one after the other, with the detecting, processing, and grouping of the scans associated with each respective symbol useful in monitoring the quality and quality trends of a plurality of the bar code symbols disposed on the moving substrate, the method comprising the steps of:

a) continuously scanning the moving substrate to enable the detection bar code symbols disposed thereon;

b) detecting the presence of a bar code symbol moving into the field of view of the scanner unit by scanning the symbol and determining a valid decode;

c) processing the first decoded scan and a plurality of subsequent decodable and non-decodable scans associated with the bar code symbol to determine at least one evaluation attribute for each scan processed;

d) conducting step c) until a predetermined number of consecutive non-decodable scans are processed, thereby indicating the absence of the bar code symbol from the field of view of the scanner unit and that the symbol has moved past the scanner unit;

e) Repeating steps b), c), and d) for a chosen plurality of bar code symbols in the succession of bar code symbols.

2. The method of claim 1 comprising the additional step of assigning a measure of quality to each evaluation attribute determined for each scan processed.

3. The method of claim 2 wherein the measure of quality assigned each evaluation attribute of each scan of a group of scans is combined to determine an overall measure of quality for each bar code symbol scanned, the overall measure of quality indicative of the overall quality of the scanned symbol.

4. The method of claim 3 wherein the overall measure of quality determined for a bar code symbol scanned is assigned a particular weighted value selected from a predetermined plurality of weighted values, the weighted value indicative of the relative quality of the bar code symbol.

5. The method of claim 4 further comprising the step of maintaining a count of the total number of bar code symbols that are detected in step b) during a predefined interval.

6. The method of claim 4 wherein a count of the number of bar code symbols assigned to each weighted value of the plurality of weighted values is maintained during the predefined interval, the count of the number of symbols assigned to each weighted value being updated with each symbol that is detected and processed.

7. The method of claim 6 wherein the count of the total number of symbols detected during the interval is divided into the count of the number of bar code symbols having each particular weighted value during the interval to determine the percentage of symbols assigned to each weighted value of the plurality of weighted values, thereby determining a plurality of percentages indicating the percentage of symbols assigned to each weighted value during the interval with respect to the total number of symbols detected and processed during the interval.

8. The method of claim 7 wherein a warning means is activated if the percentage of symbols assigned to a particular weighted value exceeds a predefined maximum percentage.

9. The method of claim 7 wherein a warning means is activated if a numerical sum of percentages of symbols assigned to two or more weighted values exceeds a predetermined maximum total percentage.

10. A method to detect, process, and group a plurality of scans associated with a plurality of spaced bar code symbols in a succession, the spaced bar code symbols disposed on a moving substrate having a plurality of repeating regions with each region including at least one bar code symbol, each bar code symbol of the plurality of symbols moving past a scanner unit arranged to scan each respective symbol, with the detection, processing, and grouping of scans associated with each symbol useful in monitoring the quality of a plurality of the bar code symbols, the method comprising the steps of:

a) detecting the start of a respective region of the moving substrate having a bar code symbol disposed therein;

b) continuously scanning the region of the substrate to detect bar code symbols disposed therein;

c) doing one of the following:
   i) detecting the entry of a bar code symbol in the field of view of the scanner unit by scanning the symbol and determining a valid decode, and continuing to step d; and
   ii) detecting the start of the next adjacent region, and continuing to step f);

d) processing the first decoded scan and a plurality of subsequent decodable and non-decodable scans associated with the bar code symbol to determine and store at least one evaluation attribute for each scan processed;

e) conducting step d) until a predetermined number of consecutive non-decodable scans are processed, thereby indicating the absence of the bar code symbol from the field of view of the scanner unit and that the symbol being scanned has moved past the scanner unit;

f) Repeating steps a) through f), as required, for a plurality of bar code symbols in the succession of bar code symbols.

11. The method of claim 10 further comprising the step of maintaining a count of the total number of regions detected during a predefined interval.

12. The method of claim 11 further comprising the step of maintaining a count of the total number of bar code symbols that are detected via a valid decode during the predefined interval.

13. The method of claim 12 comprising the additional step of assigning a measure of quality to each evaluation attribute determined for each scan of a scanned and processed symbol.

14. The method of claim 13 wherein the measure of quality assigned each evaluation attribute of each scan is combined to determine an overall measure of quality for each bar code symbol scanned, the overall measure of quality being indicative of the overall quality of the symbol.

15. The method of claim 14 wherein the overall measure of quality determined for each bar code symbol scanned is assigned a particular weighted value selected from a predetermined plurality of weighted values, the weighted value indicative of the relative quality of the bar code symbol.

16. The method of claim 15 wherein a count of the number of bar code symbols assigned to each weighted value of the plurality of weighted values is maintained during the predefined interval;

the count of the number of symbols assigned to a weighted value updated with the occurrence of one of the following:

i) with the processing and assigning of a weighted value to each detected and scanned bar code symbol; and ii) with the scanning of each region in which a bar code symbol is not detected, and causing the lowest weighted value to be updated.

17. The method of claim 16 wherein the count of the total number of regions detected is divided into the count of the number of bar code symbols having each particular weighted value to determine the percentage of symbols assigned to each weighted value of the plurality of weighted values, thereby determining a plurality of percentages indicating the percentage of symbols assigned to each weighted value with respect to the total number of regions detected.

18. The method of claim 10, wherein the detection of a start of a region having a bar code symbol disposed therein is provided by an eye mark sensor operative to detect the presence of spaced eye marks disposed on the moving substrate, said eye marks being repeated and disposed in front of each region.

19. The method of claim 10, wherein the detection of a start of a region of the substrate having a bar code symbol printed therein on a printing press, is provided by a method of counting, in an automated manner, gear teeth of a gear wheel of an impression cylinder of the printing press, the method of counting gear teeth to detect delimitations between two adjacent regions comprising the steps of:

a) determining an initial gear teeth count value;

b) incrementing the count value when a gear tooth is rotated past a fixed reference location adjacent to the gear wheel of the impression cylinder, a change in the count value indicating a partial rotation of the impression cylinder;

c) detecting a delimitation between regions when the count value equals a predetermined count value, the predetermined count value indicative of the position of at least one region relative to the scanner unit;

d) evaluating the count value to determine if the change from the initial count value determined in step a) indicates one full revolution of the impression cylinder;

e) doing one of the following:
   i) if the count value determined in step d) indicates one full revolution of the impression cylinder, continuing to step a; and
   ii) if the count value determined in step d) is not indicative one full revolution of the impression cylinder, continuing to step b.

20. A method of processing and evaluating the level of quality of a succession of spaced bar code symbols disposed on a moving substrate having a succession of repeating images, each repeating image including at least one bar code symbol, the quality of a plurality of the bar code symbols determined by processing and grouping a plurality of scan reflectance profiles associated with each bar code symbol, said scan reflectance profiles generated by a scanner unit arranged to scan each bar code symbol as the symbol moves past the scanner unit, the method comprising the steps of:

a) continuously scanning the substrate to detect each bar code entering a field of view of the scanner unit, the detection of each bar code symbol provided by a first valid decode of a respective symbol;

b) decoding, determining, and storing at least one measure of quality for each scan reflectance profile produced by scanning the detected bar code symbol;

c) conducting step b) until a predetermined number of consecutive non-decodable scans are processed, thereby indicating the absence of the bar code symbol from the field of view of the scanner unit and that the bar code symbol being scanned has moved past the scanner unit;

d) detecting a delimitation between two adjacent repeating images, thereby indicating the end of scans associated with the bar code symbols of the image being scanned;

e) combining one or more of the measures of quality determined and stored in step d) to determine an overall measure of quality associated with each scanned bar code symbol of the repeating image;

f) conducting steps a, b), c), d) and e) for a plurality of repeating images in the succession of repeating images to enable the monitoring the quality of scanned symbols.

21. The method of claim 20 further comprising the step of maintaining a count of the total number of delimitations detected between repeating images.

22. The method of claim 21 further comprising the step of maintaining a count of the total number of bar code symbols detected via a valid decode.

23. The method of claim 22 wherein the percentage of non-decodable bar code symbols scanned is computed from the count of the number of delimitations detected and the count of the total number of bar code symbols detected.

24. The method of claim 22 wherein the overall measure of quality determined for each bar code symbol scanned is assigned a particular weighted value selected from a predetermined plurality of weighted values, the weighted value indicative of the relative quality of the bar code symbol.

25. The method of claim 24 wherein a count of the number of bar code symbols assigned to each weighted value of the plurality of weighted values is maintained.

26. The method of claim 25 wherein the count of the total number of delimitations detected is divided into the count of the number of bar code symbols having each particular weighted value to determine the percentage of symbols assigned to each weighted value of the plurality of weighted values, thereby determining a plurality of percentages indicating the percentage of symbols assigned to each weighted value with respect to the total number of delimitations detected.

27. The method of claim 20, wherein the detection of delimitations between adjacent images is provided by an eye mark sensor operative to detect the presence of eye marks disposed on the moving substrate, said eye marks being repeated and disposed in front of each of the images in the succession of repeating images.

28. The method of claim 20, wherein the detection of delimitations between repeating images being printed on a printing press is provided by a method of counting, in an automated manner, gear teeth of a gear wheel of an impression cylinder of the printing press, the method of counting gear teeth to detect delimitations between successively printed images comprising the steps of:

a) determining an initial gear teeth count value;

b) incrementing the count value when a gear tooth is rotated past a fixed reference location adjacent to the gear wheel of the impression cylinder, a change in the count value indicating a partial rotation of the impression cylinder;

c) detecting a delimitation between repeating images when the count value equals a predetermined count value, said predetermined count value indicative of the position of at least one repeating image relative to a scanner unit;

d) evaluating the count value after incrementing the count in step b) to determine if the change from the initial count value determined in step a) indicates one full revolution of the impression cylinder;

e) doing one of the following:
   i) if the count value determined in step d) indicates one full revolution of the impression cylinder, continuing to step a); and
   ii) if the count value determined in step d) is not indicative one full revolution of the impression cylinder, continuing to step b).

* * * * *